(12) United States Patent
Salama et al.

(10) Patent No.: US 9,635,087 B2
(45) Date of Patent: *Apr. 25, 2017

(54) SYSTEM FOR MONITORING CONVERSATIONAL AUDIO CALL QUALITY

(71) Applicant: International Business Machines Corporation, Armonk, NY (US)

(72) Inventors: Hitham A. A. Salama, Dublin (IE); Jonathan Dunne, Waterford (IE); James P. Galvin, Jr., Georgetown, KY (US); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/694,138

(22) Filed: Apr. 23, 2015

(65) Prior Publication Data

US 2016/0142464 A1    May 19, 2016

Related U.S. Application Data

(63) Continuation of application No. 14/546,131, filed on Nov. 18, 2014.

(51) Int. Cl.
  *H04L 29/06* (2006.01)
  *H04L 12/26* (2006.01)
  *H04L 12/24* (2006.01)

(52) U.S. Cl.
  CPC ............ *H04L 65/80* (2013.01); *H04L 41/147* (2013.01); *H04L 41/5067* (2013.01);
  (Continued)

(58) Field of Classification Search
  CPC ... H04L 65/80; H04L 41/147; H04L 41/5067; H04L 41/5087; H04L 43/08–43/0894;
  (Continued)

(56) References Cited

U.S. PATENT DOCUMENTS 6,842,768 B1 * 1/2005 Shaffer ................... H03M 7/30
    709/203
7,369,537 B1    5/2008 Kirchhoff et al.
(Continued)

FOREIGN PATENT DOCUMENTS

JP    2004146922 A    10/2002
WO   2007127481 A3   11/2007

OTHER PUBLICATIONS

H. Assem, D. Malone, J. Dunne and P. O'Sullivan, "Monitoring VoIP call quality using improved simplified E-model," Computing, Networking and Communications (ICNC), 2013 International Conference on, San Diego, CA, 2013, pp. 927-931. http://ieeexplore.ieee.org/stamp/stamp.jsp?tp=&arnumber=6504214&isnumber=6504039.*

(Continued)

*Primary Examiner* — Mark Rinehart
*Assistant Examiner* — Kenneth P Hunt
(74) *Attorney, Agent, or Firm* — Edward P. Li

(57) ABSTRACT

A method, a computer program product, and a computer system for monitoring conversational audio quality of Voice over Internet Protocol (VoIP) are provided. A monitoring system determines a size of an audio file and an available bandwidth. The monitoring system predicts time of receiving the audio file, based on the size and the bandwidth. The monitoring system determines whether the time of receiving the audio file exceeds a monitoring timer interval by a certain threshold. The monitoring system uses an intrusive testing method for monitoring call quality, in response to determining that the time of receiving the audio file exceeds the monitoring timer interval by the certain threshold.

10 Claims, 3 Drawing Sheets

(52) U.S. Cl.
CPC ...... *H04L 43/0888* (2013.01); *H04L 41/5087* (2013.01); *H04L 43/0894* (2013.01)

(58) Field of Classification Search
CPC ..... H04W 24/08; H04M 3/22; H04M 3/2227; H04M 3/2236
USPC .................................. 370/252; 455/423–425
See application file for complete search history.

(56) References Cited

U.S. PATENT DOCUMENTS

| | | | | |
|---|---|---|---|---|
| 8,270,309 | B1* | 9/2012 | Jones | H04L 43/0852 370/248 |
| 8,559,320 | B2 | 10/2013 | Khanduri | |
| 8,570,896 | B2 | 10/2013 | Bugenhagen | |
| 8,583,102 | B2* | 11/2013 | Shah | H04W 4/12 455/414.4 |
| 2003/0123446 | A1* | 7/2003 | Muirhead | H04L 12/4641 370/392 |
| 2004/0039970 | A1* | 2/2004 | Barnard | H04L 12/2697 714/43 |
| 2007/0008899 | A1 | 1/2007 | Shim et al. | |
| 2007/0025248 | A1* | 2/2007 | Freytsis | H04L 12/2602 370/230 |
| 2008/0225736 | A1* | 9/2008 | Compton | H04L 12/5695 370/252 |
| 2010/0014431 | A1* | 1/2010 | Bajpay | H04L 41/06 370/242 |
| 2010/0287298 | A1* | 11/2010 | Leung | H04H 20/16 709/232 |
| 2013/0182578 | A1 | 7/2013 | Eidelman et al. | |
| 2014/0029446 | A1* | 1/2014 | Loher | H04M 3/2236 370/249 |
| 2014/0160972 | A1* | 6/2014 | Ketonen | H04L 12/2602 370/252 |
| 2014/0358526 | A1* | 12/2014 | Abdelal | G10L 25/30 704/202 |
| 2016/0028881 | A1* | 1/2016 | Assem | H04M 3/2227 370/252 |
| 2016/0028882 | A1* | 1/2016 | Assem | H04M 3/2227 370/252 |
| 2016/0142463 | A1* | 5/2016 | Salama | H04L 43/0888 370/252 |
| 2016/0191700 | A1* | 6/2016 | Assem | H04M 3/2227 370/252 |
| 2016/0248907 | A1* | 8/2016 | Assem | H04M 3/2227 |

OTHER PUBLICATIONS

Y. Han, J. Fitzpatrick, L. Murphy and J. Dunne, "Accuracy analysis on call quality assessments in voice over IP," Wireless and Mobile Networking Conference (WMNC), 2013 6th Joint IFIP, Dubai, 2013, pp. 1-7 http://ieeexplore.ieee.org/stamp/stamp.jsp?tp=&arnumber=6549060&isnumber=6548948.*

Appendix P List of IBM Patents or Patent Applications Treated as Related.

U.S. Appl. No. 14/546,131 entitled "System for Monitoring Conversational Audio Call Quality" filed Nov. 18, 2014.

\* cited by examiner

US 9,635,087 B2

SYSTEM FOR MONITORING CONVERSATIONAL AUDIO CALL QUALITY

CROSS REFERENCE TO RELATED APPLICATION

This application is a Continuation application of pending U.S. patent application Ser. No. 14/546,131 filed on Nov. 18, 2014.

TECHNICAL FIELD OF THE INVENTION

The present invention relates generally to communications over computer networks, and more particularly to monitoring conversational audio quality of Voice over Internet Protocol (VoIP).

BACKGROUND

Communications traffic is increasingly being carried over computer networks, with Voice over Internet Protocol (VoIP) applications becoming popular in both the public Internet and in enterprise networks. Since IP networks do not guarantee end-to-end delay, packet loss rates, jitter, and available band-width, monitoring and estimating the VoIP call quality in prevailing network conditions is essential to mitigating issues that can significantly reduce the Quality-of-Experience (QoE) as experienced by end users.

In a VoIP application, voice/video is digitized and packetized at a sender before its transmission over the IP network to a receiver. At the receiver the packets are decoded and played out to a listener. The process of converting an analog voice signal to digital is done by a "Codec". Codecs vary in bandwidth required, latency, sample period, frame size, and the maximum achieved end user perceived quality; thus, different codecs are better suited to different network conditions. International Telecommunication Union's Telecommunication Standardization Sector (ITU-T) outlines two test methods to assess QoE: subjective testing and objective testing. Subjective testing was the earliest approach to evaluating the quality by assigning Mean Opinion Scores (MOS).

ITU-T recommendation P.800 presents the MOS subjective test procedures for audio quality testing. It usually involves 12-24 participants; the participants individually listen to an audio stream for several seconds and rate the audio quality on the scale of 1 (poor) to 5 (excellent). Similarly, International Telecommunication Union's Radiocommunication Sector (ITU-R) BT.500 presents a methodology to obtain MOS values for video quality. Subjective testing using MOS is time consuming, expensive and does not allow for real time measurements.

Several techniques are developed for monitoring MOS in an objective way, i.e., without human perception. The first technique applies an online method by locally monitoring different network characteristics at the sender to estimate call quality. Usually different network impairment factors are monitored and then used in a computational mathematical model to result in a single metric that is used for indicating the call quality in progress. Because it is mainly based on monitoring different QoS factors and then converting these factors into a single metric, the first technique can be applied regardless of the network conditions. This type of techniques is being used nowadays by industry and research as a live voice quality measurement tool. However, the first technique is considered an inaccurate method as it is considered only estimates for the transmission planning purposes and not for actual customer opinion prediction.

The second technique applies an offline method in a non-intrusive way; in other words, the second technique records from both of a sender and a receiver, then the receiver sends the recorded file to the sender where the sender can compare both recorded files using one of the intrusive algorithms, e.g., PSQM (Perceptual Speech Quality Measure), PESQ (Perceptual Evaluation of Speech Quality), and POLQA (Perceptual Objective Listening Quality Assessment). Also, current research takes into account the delay in the second technique. The second technique is the high accuracy level because it is considered the approved industrial method for measuring the VoIP call quality; however, in order to monitor the call this technique will be at the expense of bandwidth overhead as a result of sending the audio recorded file from the receiver each certain interval of time.

SUMMARY

In one aspect, a method for monitoring conversational audio quality of Voice over Internet Protocol (VoIP) is provided. The method is implemented by a monitoring system, and the method comprises: determining a size of an audio file and an available bandwidth; predicting time of receiving the audio file, based on the size and the bandwidth; determining whether the time of receiving the audio file exceeds a monitoring timer interval by a certain threshold; and using an intrusive testing method for monitoring call quality, in response to determining that the time of receiving the audio file exceeds the monitoring timer interval by the certain threshold.

In another aspect, a computer program product for monitoring conversational audio quality of Voice over Internet Protocol (VoIP) is provided. The computer program product comprises a computer readable storage medium having program code embodied therewith, the program code executable to: determine, by a monitoring system, a size of an audio file and an available bandwidth; predict, by the monitoring system, time of receiving the audio file, based on the size and the bandwidth; determine, by the monitoring system, whether the time of receiving the audio file exceeds a monitoring timer interval by a certain threshold; and use, by the monitoring system, an intrusive testing method for monitoring call quality, in response to determining that the time of receiving the audio file exceeds the monitoring timer interval by the certain threshold.

In yet another aspect, a computer system for monitoring conversational audio quality of Voice over Internet Protocol (VoIP) is provided. The computer system comprises one or more processors, one or more computer readable tangible storage devices, and program instructions stored on at least one of the one or more computer readable tangible storage devices for execution by at least one of the one or more processors. The program instructions are executable to determine, by a monitoring system, a size of an audio file and an available bandwidth. The program instructions are executable to predict, by the monitoring system, time of receiving the audio file, based on the size and the bandwidth. The program instructions are executable to determine, by the monitoring system, whether the time of receiving the audio file exceeds a monitoring timer interval by a certain threshold. The program instructions are executable to use by the monitoring system an intrusive testing method for monitoring call quality, in response to determining that the time of receiving the audio file exceeds the monitoring timer interval by the certain threshold.

DETAILED DESCRIPTION

Embodiments of this invention provide an adaptive technique based on the network condition between a sender and a receiver in a conference call. With this technique, based on a current condition of network connection between the sender and the receiver, a monitoring system is capable of determining a monitoring method which is selected from two methods, i.e., intrusive and non-intrusive methods.

There are some shortcomings of current and prior methods for monitoring, assessing, and measuring the call quality in a high accurate way in VoIP application, either point-to-points or multi-party calls. Importantly, some incorrect adaptive decisions are taken in several VoIP applications during the ongoing call for the purpose of improving the call quality, but on contrary the call quality gets worse due to that the decisions are taken based on inaccurate monitoring to the call quality.

The deficiencies of the current and prior methods are due to four main points. First, the current approved industrial standards for measuring the call quality are all intrusive methods; they require both the original and degraded signals which means such tools cannot be used for live call quality monitoring. In addition, these methods do not take into account the delay factor into the results whilst the delay is a QoS factor that affects the conversational call quality. Second, the current non-intrusive methods used for monitoring the call quality during the call are considered inaccurate and are designed for network estimation only. Third, besides the inaccuracy of the non-intrusive testing methods, these methods depend on codec coefficients which require a lot of work to derive such parameters; thus such methods are not valid for all codecs. Fourth, each proposed solution has its advantages and disadvantages, thus an adaptive method is needed to make use and switch between current solutions in order to use the optimum method for monitoring the call quality.

Embodiments of the present invention provide a monitoring system that is capable of adapting its monitoring method according to the network conditions and resulting in the optimum method to be used during the ongoing call. Embodiments of the present invention provide a monitoring system that is capable of switching between different testing methods during same VoIP call. Embodiments of the present invention are now described in detail with reference to the accompanying FIGs.

Figure 1:
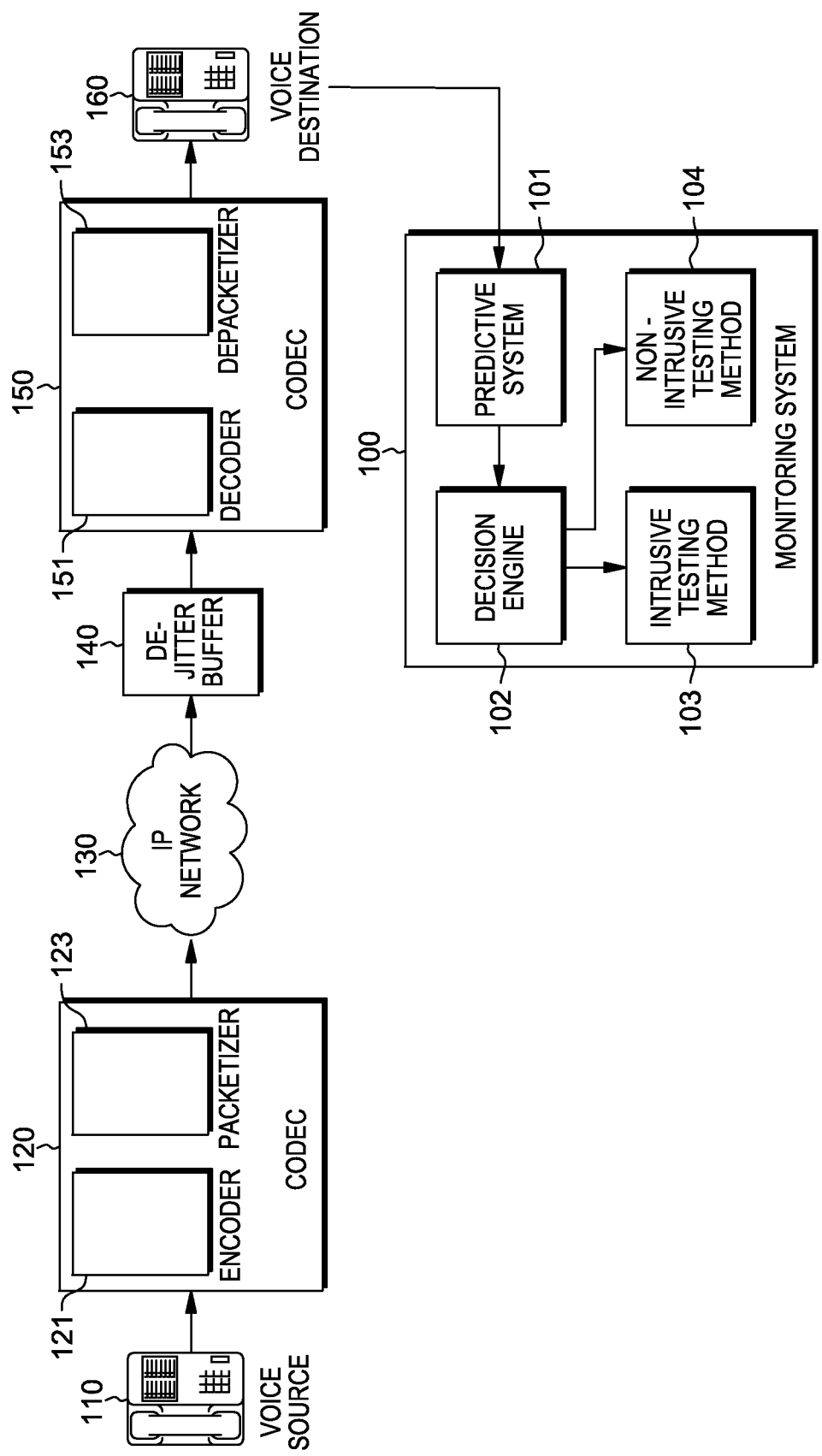
FIG. 1 is a diagram showing a monitoring system for monitoring conversational audio quality of Voice over Internet Protocol (VoIP), in accordance with one embodiment of the present invention.

FIG. 1 is a diagram showing monitoring system 100 for monitoring conversational audio quality of Voice over Internet Protocol (VoIP), in accordance with one embodiment of the present invention.

FIG. 1 shows an example of a VoIP system. The VoIP system shown in FIG. 1 comprises voice source 110, codec 120 comprising encoder 121 and packetizer 123, IP network 130, de-jitter buffer 140, codec 150 comprising decoder 151 and depacketizer 153, and voice destination 160. A VoIP call is made from voice source 110; voice is digitized and packetized by encoder 121 and packetizer 123 of codec 120. Digitized and packetized voice is transmitted over IP network 130. De-jitter buffer 140 is used to counter jitter introduced by queuing in packet switched networks so that a continuous playout of audio transmitted over IP network 130 can be ensured. The digitized and packetized voice is decoded and depacketized by decoder 151 and depacketizer 153 of codec 150, and finally received by voice destination 160.

Referring to FIG. 1, monitoring system 100 comprises predictive system 101, decision engine 102, intrusive testing method 103, and non-intrusive testing method 104. Monitoring system 100 is designed to monitor the VoIP call quality each certain time interval that equals T sec. Monitoring system 100, more specifically predictive system 101 in the embodiment, predicts the time of receiving the audio file by knowing the size of the file with the bandwidth available to send the file. Monitoring system 100, through its decision engine 102, checks whether a predicted time t for receiving the recorded audio file exceeds the monitoring timer interval T by a certain threshold, or whether t is less than or equal to the sum of T and the threshold, described as follows:

$$t \leq T + \text{threshold}$$

where threshold is greater than zero. If the t is less than or equal to the sum of T and the threshold or the time for receiving the recorded audio file does not exceed the monitoring timer interval by a certain threshold, decision engine 102 of monitoring system 100 determines that intrusive testing method 103 is used. When the condition of IP network 130 changes and consequently the t is greater than the sum of T and the threshold or the time for receiving the recorded audio file exceeds the monitoring timer interval by a certain threshold, decision engine 102 of monitoring system 100 determines that non-intrusive testing method is used.

Figure 2:
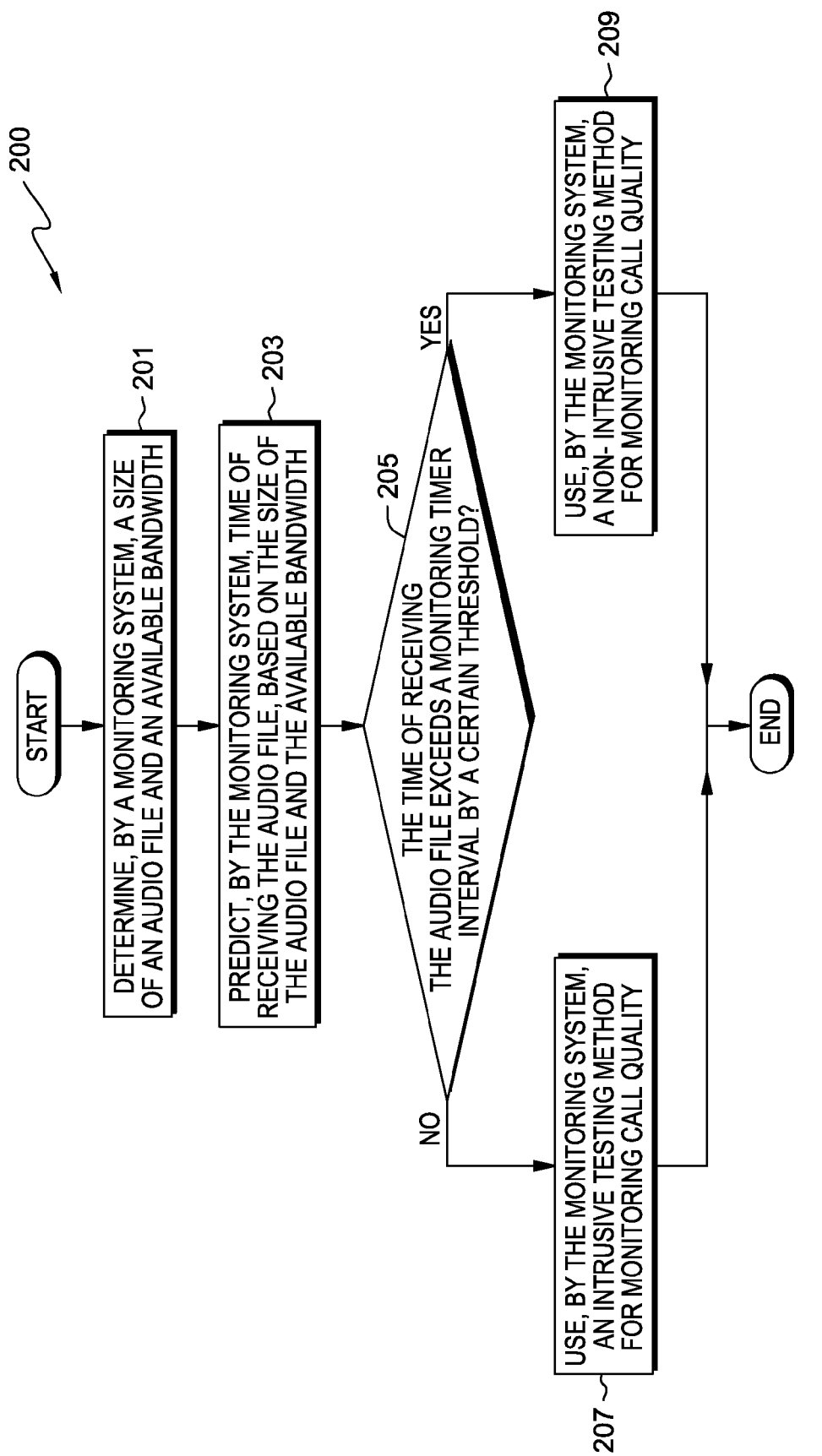
FIG. 2 is a flowchart showing operational steps of monitoring conversational audio quality of Voice over Internet Protocol (VoIP) by a monitoring system shown in FIG. 1, in accordance with one embodiment of the present invention.

FIG. 2 is flowchart 200 showing operational steps of monitoring conversational audio quality of Voice over Internet Protocol (VoIP) by monitoring system 100 shown in FIG. 1, in accordance with one embodiment of the present invention. At step 201, monitoring system 100 determines a size of an audio file and an available bandwidth. At step 203, monitoring system 101 predicts time of receiving the audio file, based on the size of the audio file and the available bandwidth. In the embodiment of the present invention, step 203 is implemented by predictive system 101 of monitoring system 100. At decision block 205, monitoring system 101 determines whether the time predicted at step 203 exceeds a monitoring timer interval by a certain threshold. In the embodiment of the present invention, decision block 205 is implemented by decision engine 102 of monitoring system 100. In response to determining that the time predicted at step 203 does not exceed the monitoring timer interval by the certain threshold (NO branch of decision block 205), monitoring system 100, at step 207, uses intrusive testing method 103 for monitoring call quality. In response to determining that the time predicted at step 203 exceeds the monitoring timer interval by the certain threshold (YES branch of decision block 205), monitoring system 100, at step 209, uses non-intrusive testing method 104 for monitoring call quality.

Figure 3:
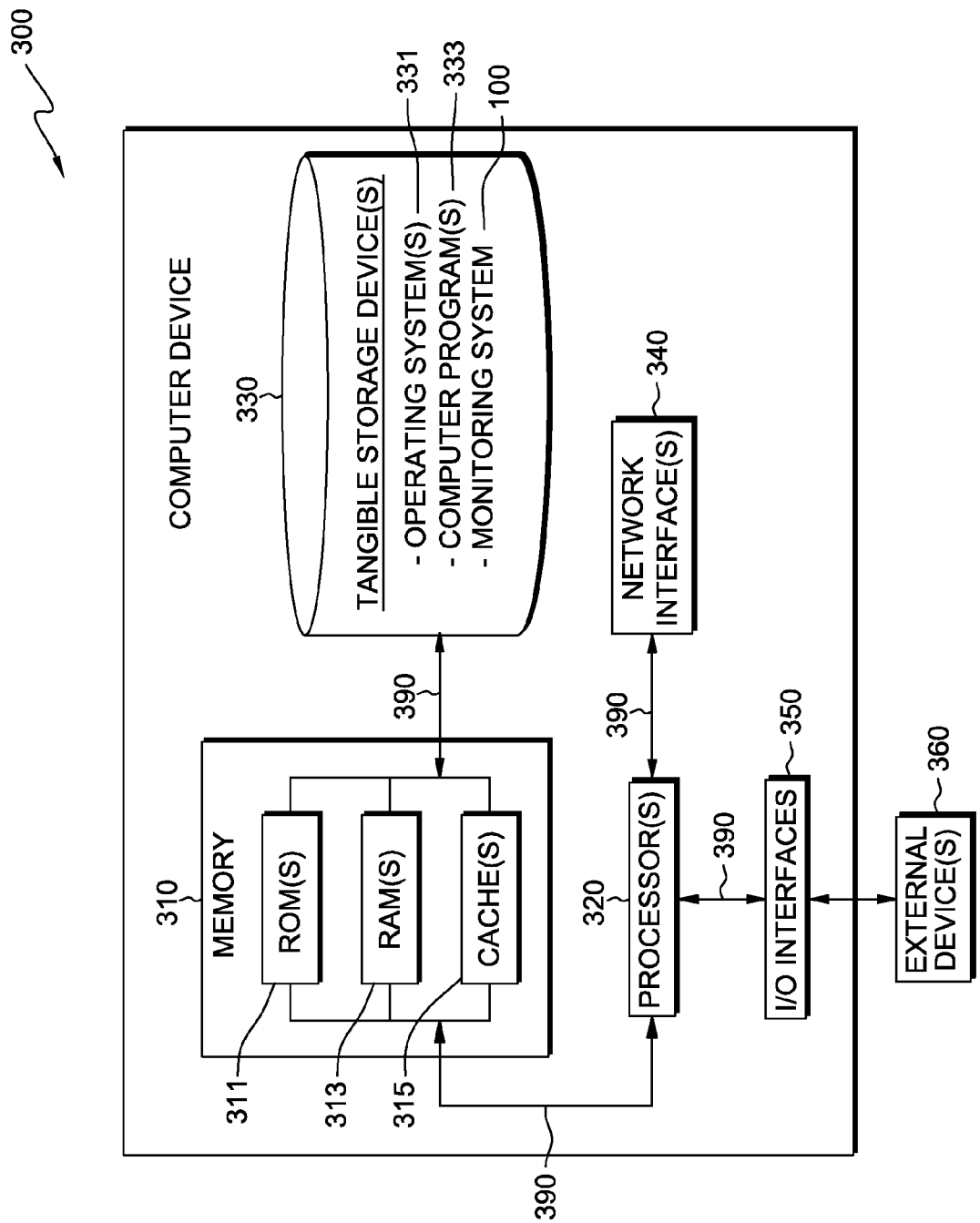
FIG. 3 is a diagram illustrating components of a computer device hosting a monitoring system shown in FIG. 1, in accordance with one embodiment of the present invention.

FIG. 3 diagram illustrating components of computer device 300 hosting a transmitter or a receiver shown in FIG. 1, in accordance with one embodiment of the present invention. It should be appreciated that FIG. 3 provides only an illustration of one implementation and does not imply any limitations with regard to the environment in which different embodiments may be implemented.

Referring to FIG. 3, computer device 300 includes processor(s) 320, memory 310, tangible storage device(s) 330, network interface(s) 340, and I/O (input/output) interface(s) 350. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. Monitoring system 100 shown in FIG. 1 resides on one or more computer readable tangible storage device(s) 330. Computing device 300 further includes I/O interface(s) 350. I/O interface(s) 350 allows for input and output of data with external device(s) 360 that may be connected to computing device 300. Computing device 300 further includes network interface(s) 340 for communications between computing device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for monitoring conversational audio quality of Voice over Internet Protocol (VoIP), the computer program product comprising a computer readable storage medium having program code embodied therewith, the program code executable to:
   determine, by a monitoring system, a size of an audio file and an available bandwidth;
   predict, by the monitoring system, time of receiving the audio file, based on the size and the bandwidth;
   determine, by the monitoring system, whether the time of receiving the audio file exceeds a monitoring timer interval by a certain threshold; and
   use, by the monitoring system, an intrusive testing method for monitoring call quality, in response to determining that the time of receiving the audio file exceeds the monitoring timer interval by the certain threshold.

2. The computer program product of claim 1, further comprising the program code executable to:
   use, by the monitoring system, a non-intrusive testing method for monitoring the call quality, in response to determining that the time of receiving the audio file does not exceed the monitoring timer interval by the certain threshold.

3. The computer program product of claim 1, wherein the monitoring system comprises a predictive system configured to predict the time of receiving the audio file.

4. The computer program product of claim 1, wherein the monitoring system comprises a decision engine configured to determine whether the time of receiving the audio file exceeds the monitoring timer interval by the certain threshold.

5. The computer program product of claim 1, wherein the monitoring system comprises a decision engine configured to determine whether the intrusive testing method or a non-intrusive monitoring method is used.

6. A computer system for monitoring conversational audio quality of Voice over Internet Protocol (VoIP), the computer system comprising:
   one or more processors, one or more computer readable tangible storage devices, and program instructions stored on at least one of the one or more computer readable tangible storage devices for execution by at least one of the one or more processors, the program instructions executable to:
   determine, by a monitoring system, a size of an audio file and an available bandwidth;
   predict, by the monitoring system, time of receiving the audio file, based on the size and the bandwidth;
   determine, by the monitoring system, whether the time of receiving the audio file exceeds a monitoring timer interval by a certain threshold; and
   use, by the monitoring system, an intrusive testing method for monitoring call quality, in response to determining that the time of receiving the audio file exceeds the monitoring timer interval by the certain threshold.

7. The computer system of claim 6, further comprising the program instructions executable to:
   use, by the monitoring system, a non-intrusive testing method for monitoring the call quality, in response to determining that the time of receiving the audio file does not exceed the monitoring timer interval by the certain threshold.

8. The computer system of claim 6, wherein the monitoring system comprises a predictive system configured to predict the time of receiving the audio file.

9. The computer system of claim 6, wherein the monitoring system comprises a decision engine configured to determine whether the time of receiving the audio file exceeds the monitoring timer interval by the certain threshold.

10. The computer system of claim 6, wherein the monitoring system comprises a decision engine configured to determine whether the intrusive testing method or a non-intrusive monitoring method is used.

* * * * *